United States Patent
Bryant et al.

[11] 3,720,241
[45] March 13, 1973

[54] MEANS FOR FEEDING FLOWABLE PARTICULATE MATERIAL

[75] Inventors: John C. Bryant, Fort Mill, S.C.; James Keith Turner, Lincolnton; James R. Reiley, Stanley, both of N.C.; Christoph W. Aurich, Clemson, S.C.

[73] Assignee: Gaston County Dyeing Machine Company, Stanley, N.C.

[22] Filed: Sept. 21, 1970

[21] Appl. No.: 73,902

[52] U.S. Cl. ................. 141/25, 302/22, 302/58, 222/161, 22/189
[51] Int. Cl. ................ B65b 1/04, B65g 53/04
[58] Field of Search ...... 198/213; 302/57, 58, 17, 22; 222/161, 400.7, 189; 141/67, 290, 26, 25, 59; 417/350

[56] References Cited

UNITED STATES PATENTS

| | | | |
|---|---|---|---|
| 1,125,413 | 1/1915 | Van Doren | 302/58 |
| 1,349,751 | 8/1920 | Cross | 302/57 |
| 3,501,062 | 3/1970 | De Witt et al. | 222/161 |
| 3,342,315 | 9/1967 | Godley | 198/213 |
| 1,879,794 | 9/1932 | Cundall | 141/290 |
| 2,733,848 | 2/1956 | Bos Houwers | 141/290 |
| 3,459,409 | 8/1969 | Goldberg | 198/213 X |
| 3,476,439 | 11/1969 | Homan | 302/17 |
| 3,428,098 | 2/1969 | Slay | 141/67 |
| 2,734,329 | 2/1956 | Fogle | 198/213 X |
| 2,663,594 | 12/1953 | Dennick | 302/22 X |
| 2,533,395 | 12/1950 | Paine | 141/26 |
| 2,814,254 | 11/1957 | Litzenberg | 417/350 |
| 2,955,726 | 10/1960 | Feldman et al. | 222/400.7 |
| 3,297,370 | 1/1967 | Moriarity | 302/59 |

FOREIGN PATENTS OR APPLICATIONS

| | | | |
|---|---|---|---|
| 1,519,216 | 2/1968 | France | 302/17 |

Primary Examiner—Evon C. Blunk
Assistant Examiner—H. S. Lane
Attorney—Channing L. Richards, Dalbert U. Shefte, Francis M. Pinckney and Richards & Shefte

[57] ABSTRACT

A feeding means for handling flowable particulate material, and particularly adapted for dealing with textile processing chemicals of powder, crystalline or pellet form. The feeding means is of the type which includes a hopper for loading with the material to be fed and a feed mechanism for receiving such material from the hopper and feeding the same, and the arrangement features a closed system for loading the hopper from a supply of the material to be fed that employs a first conduit through which air is drawn from the hopper to a material supply enclosure and a second conduit that is projectable within the enclosure to reach the material supply therein and that leads therefrom to the interior of the hopper.

7 Claims, 11 Drawing Figures

INVENTORS
JOHN C. BRYANT,
JAMES KEITH TURNER,
JAMES R. RILEY, &
BY CHRISTOPH W. AURICH

Richards & Shefte
ATTORNEYS

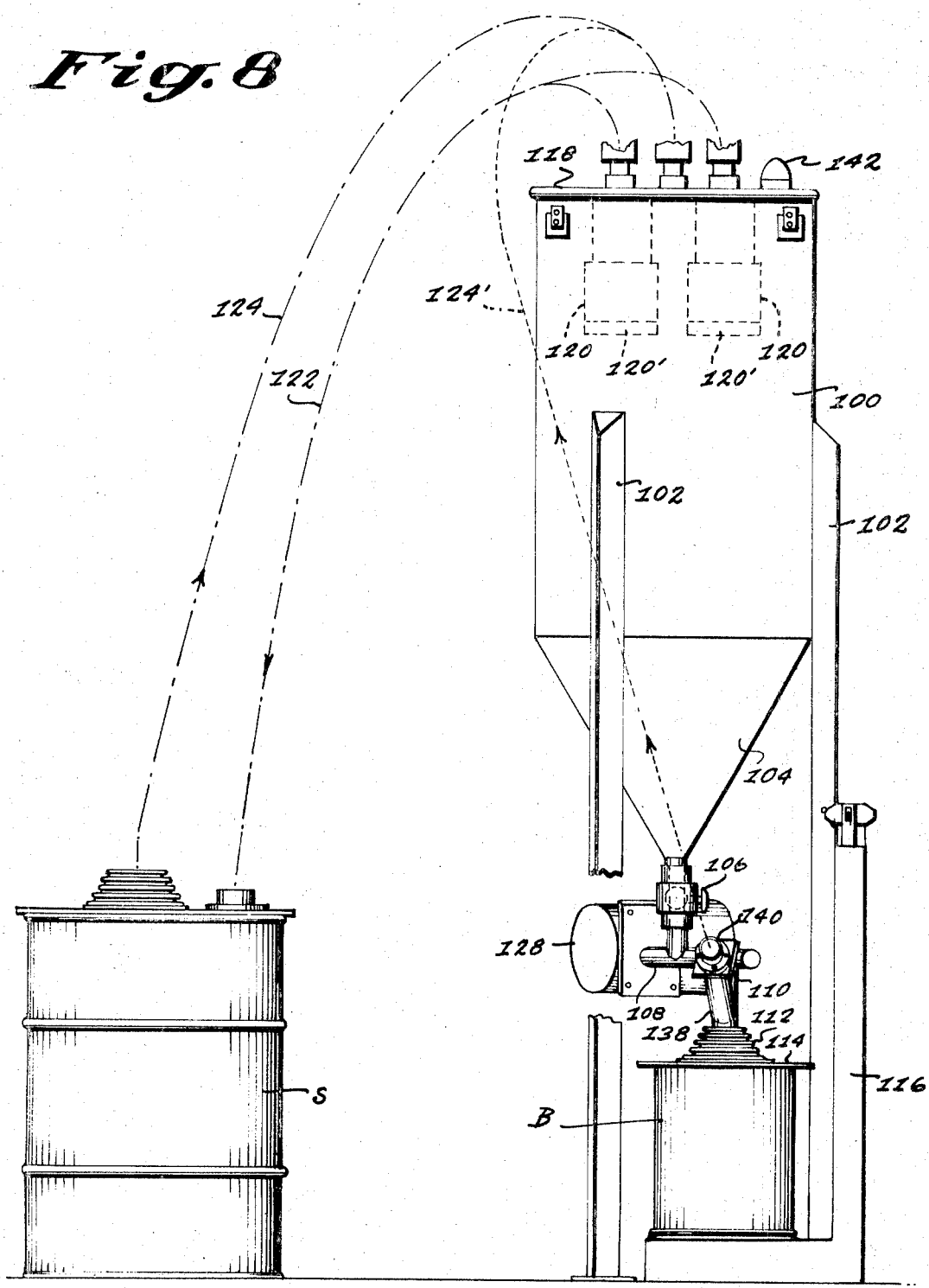

MEANS FOR FEEDING FLOWABLE PARTICULATE MATERIAL

BACKGROUND OF THE INVENTION

The wet processing of textile materials involves the handling of a number of chemicals that are supplied in powder, crystalline, pellet or other flowable particulate form and that are use in batches measured from such supplies as the need arises. Most of these materials tend to dust considerably during handling and a number of them are hygroscopic so as to be subject to caking if exposed unduly to atmospheric moisture. Such dusting and caking quite generally cause undesirable release of escaping fines and subject handling equipment to troublesome fouling. Comparable problems are commonly encountered in handling particulate materials for other purposes.

SUMMARY OF THE INVENTION

The feeding means of the present invention makes it possible to transfer flowable particulate material readily from a supply thereof and to feed the same in measured batches while dealing effectively with the objectionable dusting and caking usually attendant upon the handling of such materials. The dusting and caking is dealt with by providing a closed system for loading a hopper of the feeding means from a supply of the material to be fed, by arranging the system so that the hopper may be maintained substantially closed when feeding is not in progress, and by equipping an associated feed mechanism so that delivery of material during feeding is adequately controlled.

For these purposes, the feeding means hopper is fitted with a closure lid at which at least one blower unit is installed that is operable to draw air from the hopper interior and a first conduit means is connected to direct the blower discharge into an enclosure for a supply of the material to be fed, while a second conduit means is connected at the closure lid to form a suction leg that is projectable within the supply enclosure to reach the material therein and effect a closed system loading of the hopper.

Additionally, the hopper is provided with means for selectively closing it against delivery of material therefrom to the associated feed mechanism. This means may take the form of a simple ball valve interposed between the hopper and feed mechanism, or the feed mechanism housing may be constructed to close off the hopper when desired, as will be noted in further detail later.

Finally, the associated feed mechanism is fitted at its discharge opening with a depending boot carrying a surrounding filter cover at its lower end to form a lid for a batch container during delivery of fed material thereto, or the batch container lid is formed without a filter and the discharge fitting is arranged instead for venting to the hopper by alternative connection of the previously mentioned second conduit means thereat. Also the discharge opening is proportioned to prevent feeding surges in delivering the fed material.

These and related features of the invention are described further below in connection with the representative embodiments illustrated by the following drawings.

DESCRIPTION OF THE DRAWINGS

FIG. 8 is an elevation of a modified feeding means arrangement according to the present invention;

DESCRIPTION OF THE PREFERRED EMBODIMENTS

Figure 1:
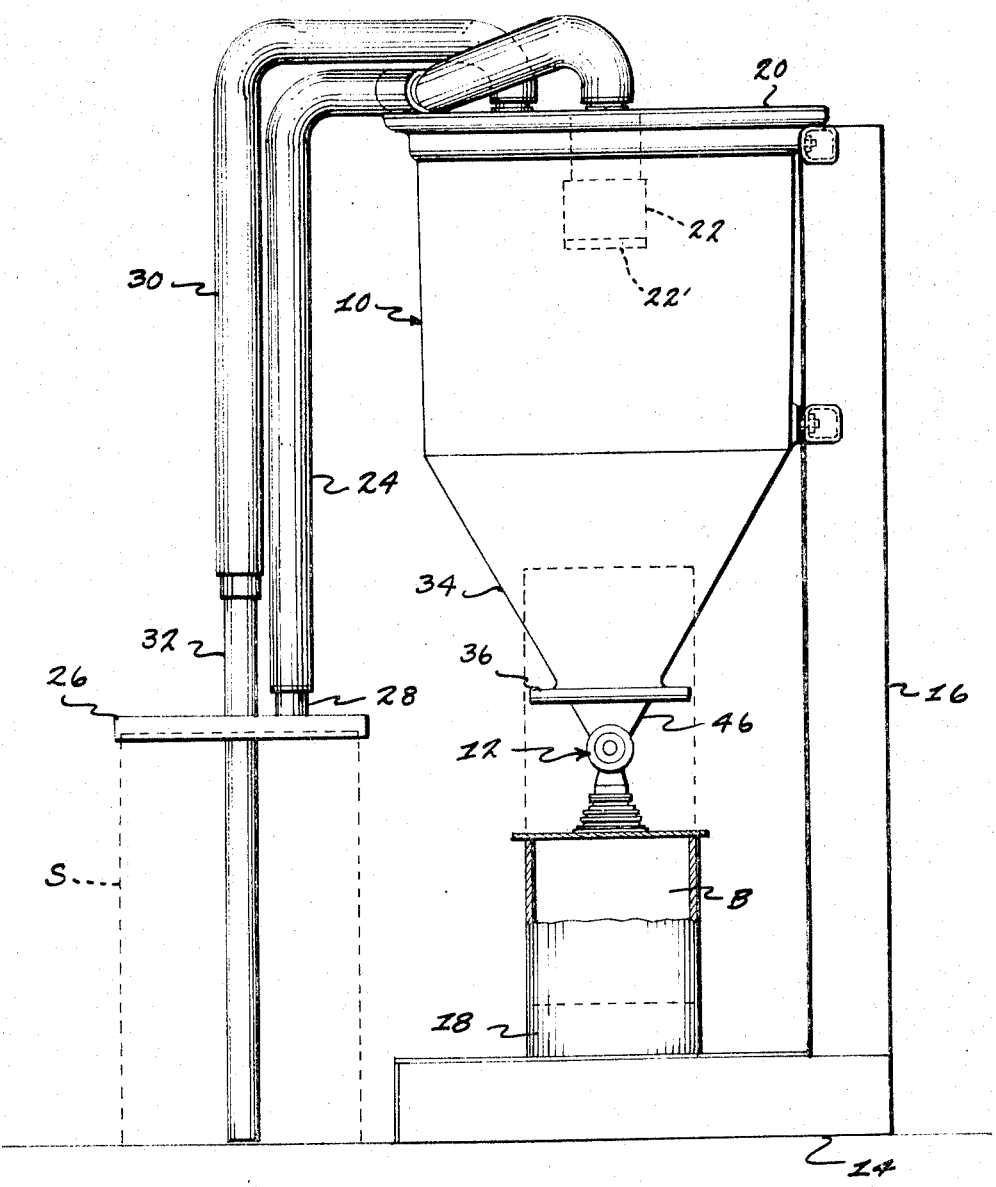
FIG. 1 is an elevation of a feeding means embodying the present invention showing the operative arrangement of the hopper loading system.

In the illustrated FIG. 1 embodiment, the feeding means hopper is indicated generally at 10 and the associated feed mechanism at 12. A platform base 14 is provided for floor support with a standard 16 rising therefrom to carry the hopper 10 at an elevated disposition, while the associated feed mechanism 12 is mounted at the hopper bottom to deliver fed material to a batch container B resting on a scale unit 18 that is arranged on the platform base 14 to allow sensing of the accumulation of fed material in the batch container B in a desired measure (compare FIGS. 1 and 2).

Figure 2:
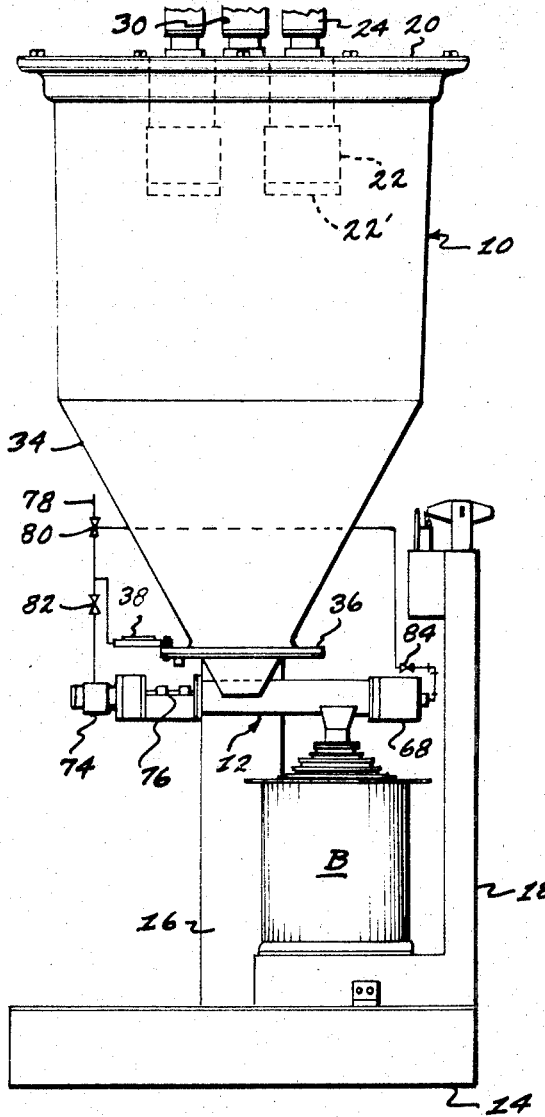
FIG. 2 is a left side elevation of the FIG. 1 feeding means with the hopper loading system largely omitted.
Figure 3:
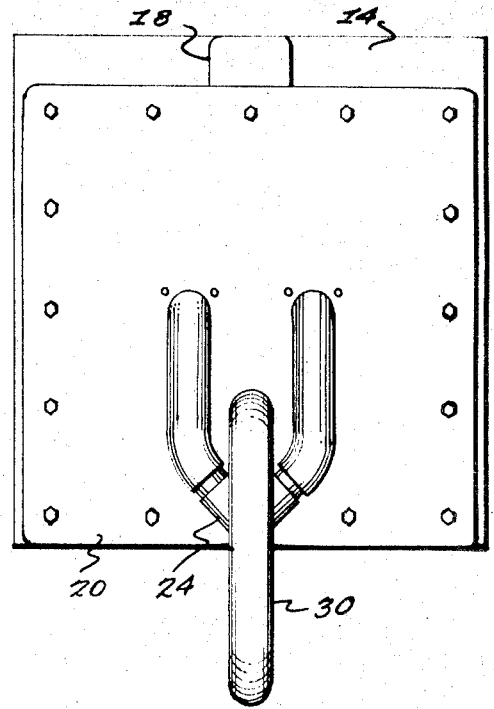
FIG. 3 is a top plan view corresponding generally to FIG. 2.

The hopper 10 is fitted at its top with a closure lid 20 at which at least one blower-motor unit is installed, a pair being indicated by dotted lines at 22 in FIG. 2. The blower-motor units 22 are of the sort frequently employed in vacuum cleaner systems, and they are arranged to draw air from the hopper interior during operation. The intake of each blower unit 22 is equipped with a filter, as indicated at 22', to remove any entrained material fines or the like from the air withdrawn, and the discharge is directed through a first conduit means 24, suitably formed principally of flexible hose, to an enclosure for a supply of the material to be fed. Where this material is a textile processing chemical, such as sodium hydrosulfite, the supply enclosure may be formed by a standard shipping container S for such material (e.g., a 55-gallon drum) from which the lid has been removed and replaced by a cover 26 having a first opening therein fitted, as at 28, for connection of the first conduit means 24, which is branched adjacent its other end for similar connection with the pair of blower-motor units 22.

A second conduit means 30, also of flexible hose, is additionally connected at the hopper closure lid 20 to form a suction leg through which material may be lifted from the container S to the hopper 10 upon operation of the blower-motor units 22 for hopper loading. To reach the material supply within the container S, a rigid tubular extension 32 is provided for the second conduit means 30 that may be projected through a second opening in the cover 26. This second cover opening is preferably formed in an annular resilient insert (not shown) proportioned for a slip fit with the extension 32 so that the latter may be progressively projected and manipulated within the container S to empty the contents readily during hopper loading.

Thus, a hopper loading operation simply involves bringing a shipping container S of the material to be fed adjacent the feeding means, replacing the container lid with the cover 26, placing the blower-motor units 22 in operation, and maintaining the conduit extension 32 immersed in the material supply until transfer of the container contents to the hopper 10 has been completed. During such transfer, air withdrawn from the hopper is delivered to the container S to replace the material supply as it is removed to load the hopper, so that the transfer system is a closed one that eliminates dusting contamination of the surrounding atmosphere and minimizes exposure of the material to atmospheric moisture during loading. Upon completion of a hopper loading operation the blower-motor units 22 are shut down, and the conduit means 24 and 30, together with the cover 26, are stowed appropriately until needed again. When stowed between loading operations the conduit means 24 and 30 serve to vent the hopper 10 so that air is allowed to enter upon feeding depletion of the hopper contents. Consequently, if the material being fed is particularly sensitive to moisture, the stowing arrangement should include means disposing the open ends of the conduits 24 and 30 so that air entering thereat is first subjected to a desiccant.

Figure 6:
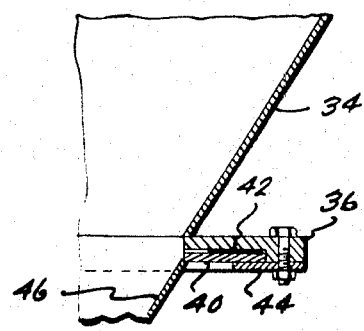
FIG. 6 is a fragmentary detail showing the arrangement for mounting the feed mechanism at the hopper bottom.

To facilitate delivery of loaded material from the hopper 10 to the associated feed mechanism 12, a lower hopper portion 34 is tapered to a bottom opening about which an external circular flange 36 is formed, and at which a vibrator unit is mounted as at 38 in FIG. 2. This flange 36 at the hopper bottom also serves as a carrying member for the associated feed mechanism 12, the lower face of flange 36 being circularly recessed, as seen in FIG. 6, to to receive a hanger flange portion 40 of feed mechanism 12 (compare FIGS. 4 and 5), with an interposed annulus 42 of Teflon or the like, and hold the same rotatably in place through bolting to an underlying retainer ring 44.

Below the hanger flange 40, the structure of feed mechanism 12 continues through a chute portion 46 that is complementary in form with respect to the lower hopper portion 34 and that terminates at an inlet opening 48 of a tubular auger housing member 50 which is fixed on the chute portion 46. The housing member 50 has an inner tubular member 52 nested therein in which a registrable inlet opening 54 is formed and which carries bearing blocks 56 and 58 at its opposite ends that provide journal supports for an auger shaft 60. The bearing blocks 56 and 58 are preferably formed of high density polyethylene and are positioned so that the auger is arranged with the housing inlet openings 48 and 54 laterally adjacent one end thereof and generally comparable housing outlet openings 62 and 64 laterally adjacent the other end. The nested inner tubular member 52 is fitted with bearing sleeves 66 of Teflon or the like so that it is adapted for rotation readily within the housing member 50 by an actuator at 68 (see FIG. 2) that is keyed to the bearing block 58 to misalign the registrable inlet and outlet openings 48, 54 and 62,64 and thereby close the hopper bottom whenever the feed mechanism is idle, while aligning them in registration for feeding operation, as will be noted further presently.

Figure 4:
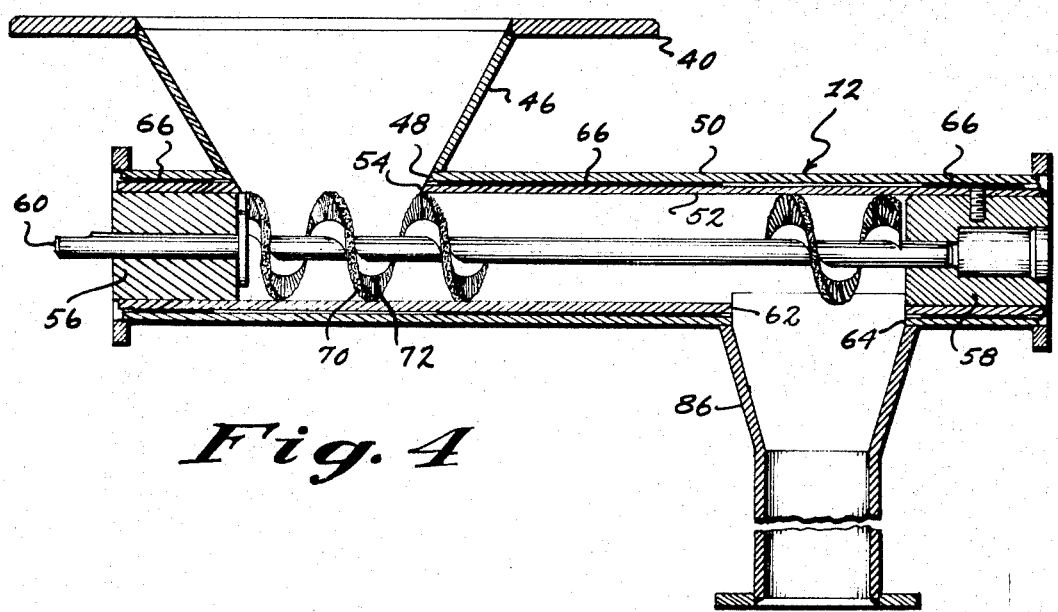
FIG. 4 is a longitudinal section detail of the feed mechanism employed in the FIG. 1 embodiment.
Figure 5:
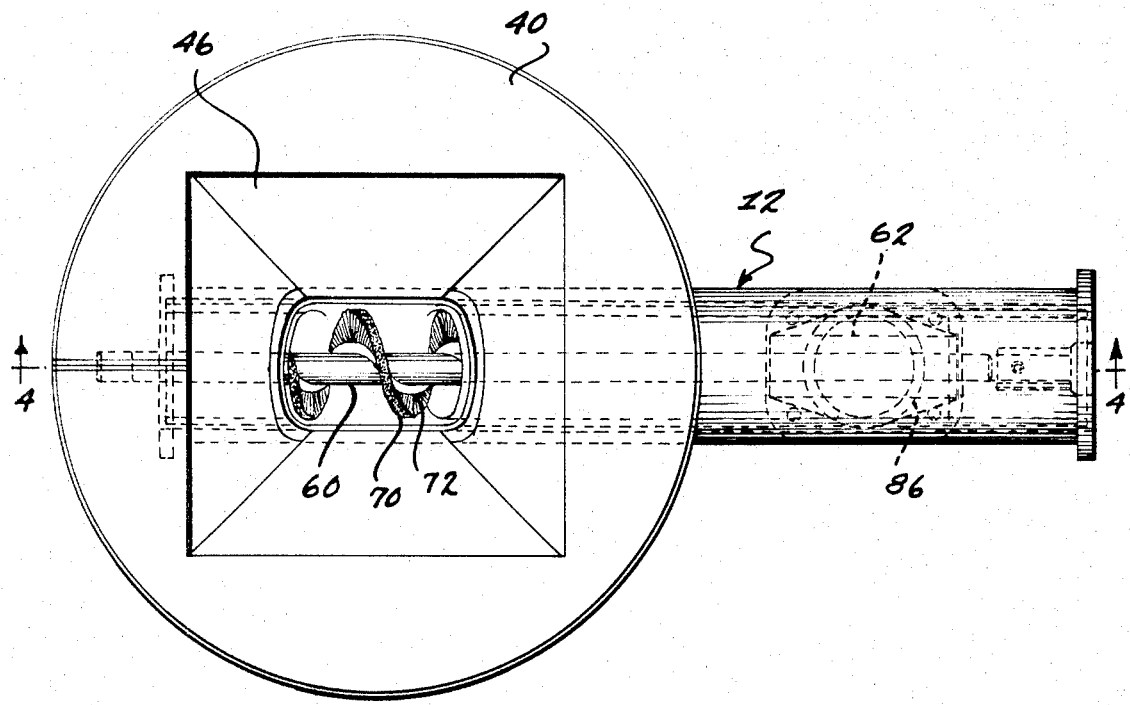
FIG. 5 is a top plan view corresponding generally to FIG. 4.

The auger employed in the feed mechanism 12 is preferably of the brush type, as indicated in FIGS. 4 and 5; that is, the spiraling auger flights are formed by bristles 70, suitably of nylon, extending in a sufficient running density and stiffness for effective brushing action from a spiral anchor channel 72 that is fixed to the auger shaft 60 by spot welding or other convenient means. A brush-type auger of this sort may be arranged so that the extending ends of the bristles 70 operate in contact with the inner surface of the auger housing (i.e., the inner surface in this instance of inner tubular member 52) so as to brush the same continually during operation and thereby maintain the feeding path clean.

A compressed air-operated gear motor 74 (see FIG. 2) is provided to drive the auger through a coupling at 76 with the auger shaft 60 adjacent the bearing block 56. The compressed air line 78 for auger motor 74 runs thereto through a solenoid valve 80 and a regulator 82, while the same air line 78 is connected from the solenoid 80 through a needle valve 84 to operate the auger housing actuator 68, and branches beyond the solenoid 80 and ahead of the regulator 82 to operate the hopper vibrator 38. The arrangement of this system is such as to require registration of the auger housing inlet and outlet openings by actuator 68 and to operate the hopper vibrator 38 whenever auger motor 74 is started, so that material is continually received by the feed mechanism 12 from the hopper 10 during auger operation and fed to the aligned auger housing outlet openings 62 and 64 for discharge to the batch container B.

Figure 7:
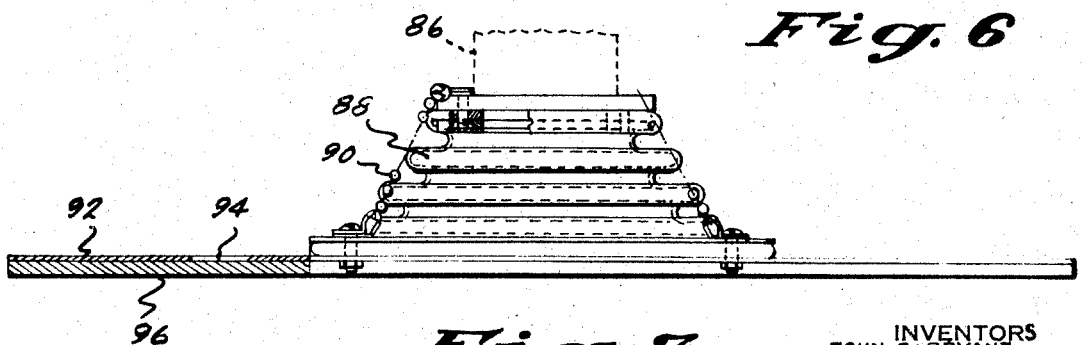
FIG. 7 is a side elevation, partly in section, of the fitting employed at the outlet opening of the feed mechanism.

Such discharge takes place through a drop leg structure 86 fixed on the auger housing 50 at the outlet opening 64 therein and carrying a depending extensible boot 58 at its lower end. The boot 88 is equipped with means, such as bead chains 90 (see FIG. 7), for limiting its maximum extent, and with a filter cover 92 for the batch container B that is attached in surrounding relation at the depending boot end. The filter cover 92 is apertured, as at 94, to expose a bottom filter layer 96 sufficiently for releasing displaced air from the batch container B while preventing escape of fines as the fed material discharges therein. This filter layer 96 is advantageously formed of a relatively fine-celled synthetic foam material which serves to seal the top edge of the batch container B readily when resting thereon while filtering the escaping air as noted above.

It should also be noted from FIGS. 4 and 5 that the auger housing outlet openings 62 and 64 are shaped rectangularly at a width narrowed transversely of the auger axis sufficiently to throttle discharge therethrough of material fed ahead of an auger flight so that exhaustion of this material is delayed until after discharge begins from ahead of a following flight. The result of this arrangement is to even out the discharge flow so as to avoid the surging that can occur through a circular outlet opening of sufficient size to allow separate dropping of material in slugs from ahead of the terminal auger flight.

As continuing auger operation results in filling the batch container B, the filling is sensed by the previously mentioned scale unit 18 on which the container B rests. The scale unit 18 is of the beam type which can be zeroed to compensate for tare weight and then set to trip a control switch at a desired batch weight so as to actuate the solenoid valve 80 to shut down the auger motor 74 and hopper vibrator 38 and cause the auger housing actuator 68 to rotate the inner tubular member 52 sufficiently to misalign the auger housing inlet and outlet openings and thereby close the hopper bottom and the auger housing as well. When this happens, the discharge end of the auger housing 50 may be swung away from the batch container B, by virtue of the earlier noted rotatable mounting of the feed mechanism hanger flange 40 at the hopper bottom, so that the measured batch can be removed readily and replaced by an empty container for filling with a succeeding batch. The auger housing is then swung back in place over the new batch container and a starting switch is closed to actuate the solenoid valve for repeating the feeding operation.

The modified embodiment illustrated in FIGS. 8–11 of the drawing is basically comparable to the one just described, although of considerably simplified design and incorporating certain alternative features to advantage. Here, a cylindrical hopper 100 is employed that is supported on three legs 102 and that tapers at a lower portion 104 for discharge connection through a manually operable ball valve unit 106 to a feed mechanism 108 having a drop leg at 110 carrying a depending extensible boot 112 and cover lid 114 arranged generally as previously described for disposition over a batch container B as it is being filled and weighed on a scale unit 116, although in this instance the cover lid 114 includes no filter element as will be noted further presently.

Figure 9:
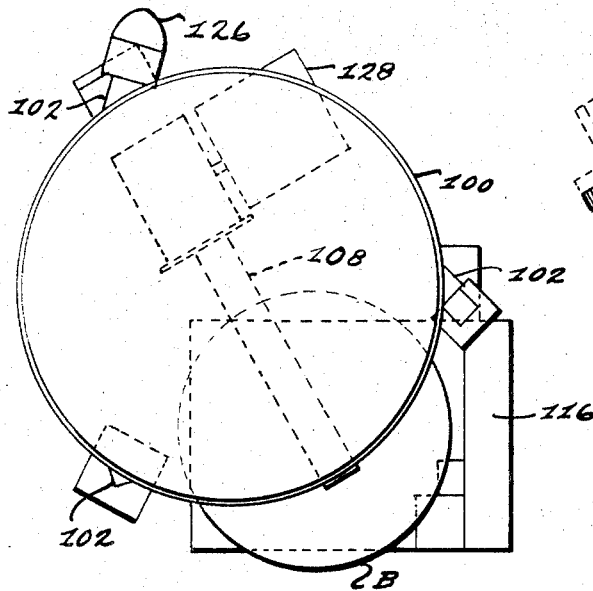
FIG. 9 is a top plan view corresponding generally to FIG. 8.
Figure 11:
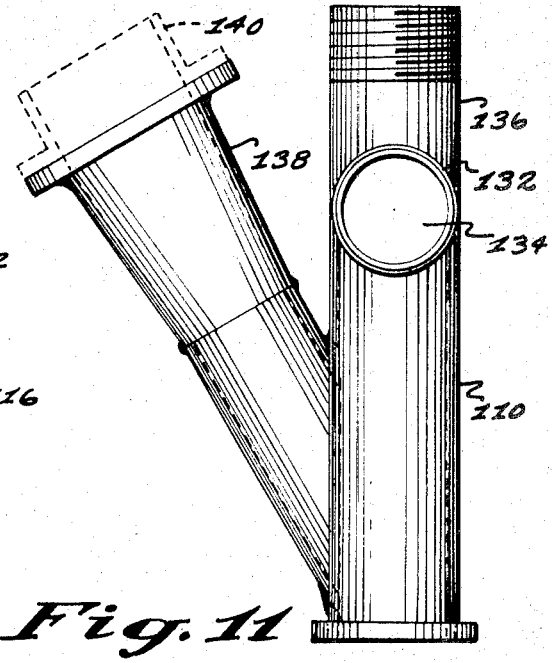
FIG. 11 is a right side elevation generally corresponding to FIG. 10.
Figure 10:
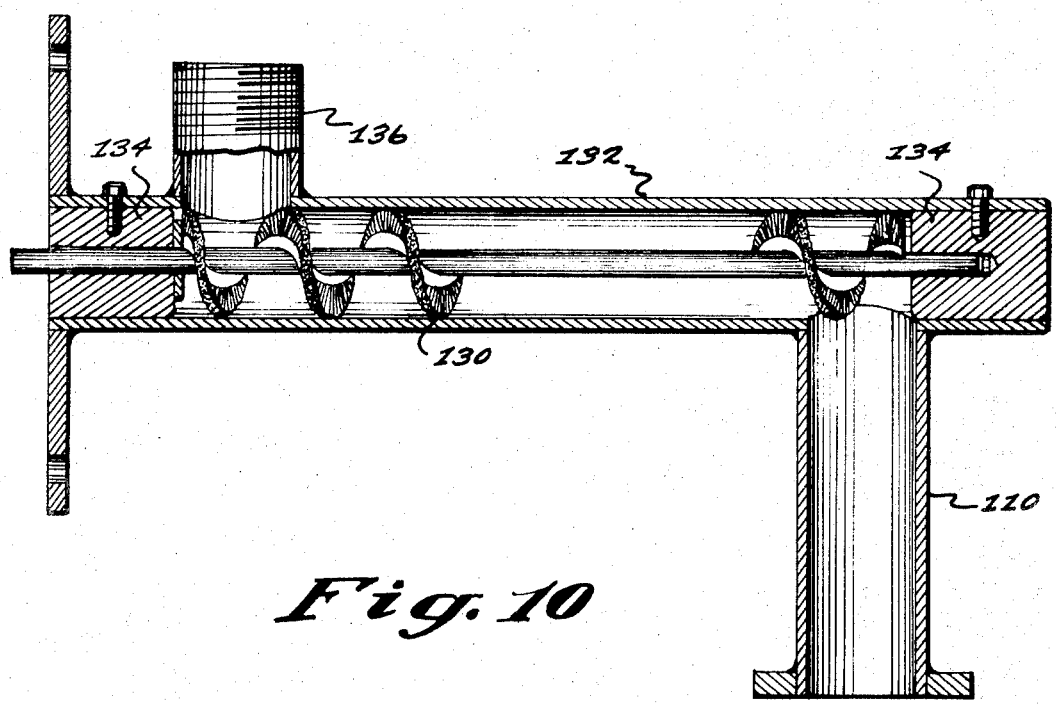
FIG. 10 is a longitudinal section of the feed mechanism employed in the FIG. 8 embodiment.

The hopper 100 is fitted with a closure lid 118 at which blower motors 120 are installed for operation to withdraw air from the hopper through first conduit means 122 and create suction through a second conduit means 124 in order to load the hopper from a supply at S of the material to be fed as in the previously described embodiment. A vibrator 126 is again provided adjacent the hopper bottom portion, being mounted this time on one of support legs 102 as indicated in FIG. 9. An electric gear-motor 128 is employed at the feed mechanism in this embodiment for driving an auger 130, which is preferably of the brush type, and the auger housing 132 is simplified to a single tubular member having bearing blocks 134 fixed therein to journal the auger 130 with one end thereof at a lateral inlet leg 136 and the other end at the drop leg 110.

The drop leg 110 is formed with an upwardly inclined vent leg 138 opening laterally therefrom and fitted at its upper end (as indicated in dotted lines at 140 in FIG. 11) for alternative connection thereat of the second conduit means 124 when the blower motors 120 are idle, the alternative conduit connection being represented by the dotted line indication at 124' in FIG. 8. By virtue of this arrangement particulate material dust generated incident to discharge of fed material into the batch container B is vented harmlessly to the hopper 100 along with the air displaced from the container B by the discharge. Such an arrangement is particularly useful when the material being handled has excessive dusting characteristics, and it has the further advantage of eliminating any need for providing a filter element at the batch container cover lid 114.

The presently described embodiment also includes a second vibrator 142 that is additionally installed at the hopper closure lid 118 (see FIG. 8) for operation when the blower units 120 are idle to clean the filter means 120' provided thereat by shaking off particulate material dust strained from the air drawn there-through during blower unit operation. Both this vibrator 142 and the one (126) provided adjacent the hopper bottom portion are electrically actuated so that no air is needed for the FIG. 8-11 embodiment.

Operation of this modified embodiment proceeds comparable to that of the previously described one. The first and second conduit means 122 and 124 are employed exactly as before to load the hopper 100 from a supply container S, the ball valve unit 106 being manually set to close the bottom of hopper 100 as this is done. When the hopper loading is completed, the blower units 120 are stopped, the second conduit means is shifted to its 124' position and connected at the vent leg 138, the ball valve unit 106 is manually opened, and the auger motor 128 and vibrators 126 and 142 are started. Material is thereupon received from the hopper 100 by the feed mechanism 108 and fed to the drop leg 110 for discharge into the batch container B on the scale unit 116. The scale unit 116, as in the previously described embodiment, is set to trip a control switch at a desired batch weight so as to stop the auger motors and vibrators each time a batch has been weighed. The weighed batch is then removed and an empty batch container B is placed beneath the cover lid 114 to receive a succeeding measured batch.

During each feeding operation the vibrator 142 at the hopper closure lid 118 acts to shake dust from the blower unit filter means 120' that has accumulated thereat during the hopper loading operation, so that the air flow characteristics of the filter means are effectively restored by the time hopper reloading is needed and the useful life of the filter means is thereby substantially extended. Also, as previously mentioned, the alternative connection of the second conduit means 124 at the vent leg 138 effectively controls the dusting that occurs as the fed material discharges into the batch container B during each feeding operation.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. In means for feeding flowable particulate material which includes a hopper for loading with the material to be fed and a feed mechanism for receiving such material from said hopper and feeding the same, the improvement comprising a closure lid for said hopper having a blower unit installed thereat and operable to draw air from the interior of said hopper, a first conduit means connecting said blower unit to discharge within an enclosure for a supply of the material to be fed, a second conduit means projectable within said enclosure to the material supply and leading therefrom to the interior of said hopper, said feed mechanism incorporating an auger operably disposed in a tubular housing, inner and outer tubular members forming said auger housing, said tubular members being nested and having registrable inlet and outlet openings arranged therein laterally adjacent opposite ends of said auger, and said inner tubular member being selectively rotatable within the outer one for aligning said openings during auger operation and for misaligning the openings to close the hopper by closing the auger housing whenever the auger is idle.

2. In means for feeding flowable particulate material which includes a hopper for loading with the material to be fed and a feed mechanism for receiving such material from said hopper and feeding the same, the improvement comprising a closure lid for said hopper having a blower unit installed thereat and operable to draw air from the interior of said hopper, a first conduit means connecting said blower unit to discharge within an enclosure for a supply of the material to be fed, a second conduit means projectable within said enclosure to the material supply and leading therefrom to the interior of said hopper, said feed mechanism incorporating an auger operably disposed in a tubular housing having inlet and outlet openings arranged therein laterally adjacent opposite ends of said auger, said auger housing being fitted at said outlet opening for discharging fed material into a batch container and being connected with said hopper at said inlet opening for swinging said outlet opening selectively over and away from said batch container.

3. The improvement in means for feeding flowable particulate material as defined in claim 2 and further characterized in that the discharge fitting at said housing outlet opening includes a depending extensible boot equipped with means for limiting its maximum extent, and a filter cover for said batch container carried by said boot in surrounding relation at its depending end.

4. The improvement in means for feeding flowable particulate material as defined in claim 2 and further characterized in that the discharge fitting at said housing outlet opening includes a drop leg formed with an upwardly inclined vent leg opening laterally therefrom and arranged for alternative connection thereto of said second conduit means when said blower unit is idle, so that particulate material dust generated incident to discharge into said batch container is vented to said hopper along with air displaced from said container by said discharge.

5. In means for feeding flowable particulate material which includes a hopper for loading with the material to be fed and a feed mechanism for receiving such material from said hopper and feeding the same, the improvement comprising a closure lid for said hopper, conduit means connected at said lid for loading said hopper, and an auger operably disposed in a tubular housing having inlet and outlet openings arranged therein laterally adjacent opposite ends of said auger to form said feed mechanism, said auger housing being connected with said hopper at said inlet and being fitted at said outlet opening for discharging fed material into a batch container, the discharge fitting at said housing outlet opening including a drop leg formed with an upwardly inclined vent leg opening laterally therefrom and arranged for connection of said conduit means additionally thereat when said hopper is not being loaded so that particulate material dust generated incident to discharge of fed material into said batch container is vented to said hopper along with air displaced from said container by said discharge.

6. In means for feeding flowable particulate material which includes a hopper for loading with the material to be fed and a feed mechanism for receiving such material from said hopper and feeding the same, the improvement comprising a closure lid for said hopper, an outlet opening from said feed mechanism for discharging fed material into a batch container, said outlet opening being fitted with a drop leg formed with a vent leg opening laterally therefrom and with a cover lid for maintaining said batch container closed while fed material is discharged therethrough from said drop leg into said container, and conduit means connectable between said vent leg and said hopper closure lid so that particulate material dust generated incident to discharge of fed material into said batch container is vented to said hopper along with air displaced from said container by said discharge.

7. In means for feeding flowable particulate material which includes a hopper for loading with the material to be fed and a feed mechanism for receiving such material from said hopper and feeding the same, the improvement comprising an auger operably disposed in a tubular housing having inlet and outlet openings arranged therein laterally adjacent opposite ends of said auger to form said feed mechanism, said auger housing being fitted at said outlet opening for discharging fed material into a batch container and being connected with said hopper at said inlet opening for swinging said outlet opening selectively over and away from said batch container.

* * * * *